Nov. 9, 1965  O. C. NIEDERER ETAL  3,216,549
EGG SUPPORTING MEANS
Filed June 28, 1963  2 Sheets-Sheet 2
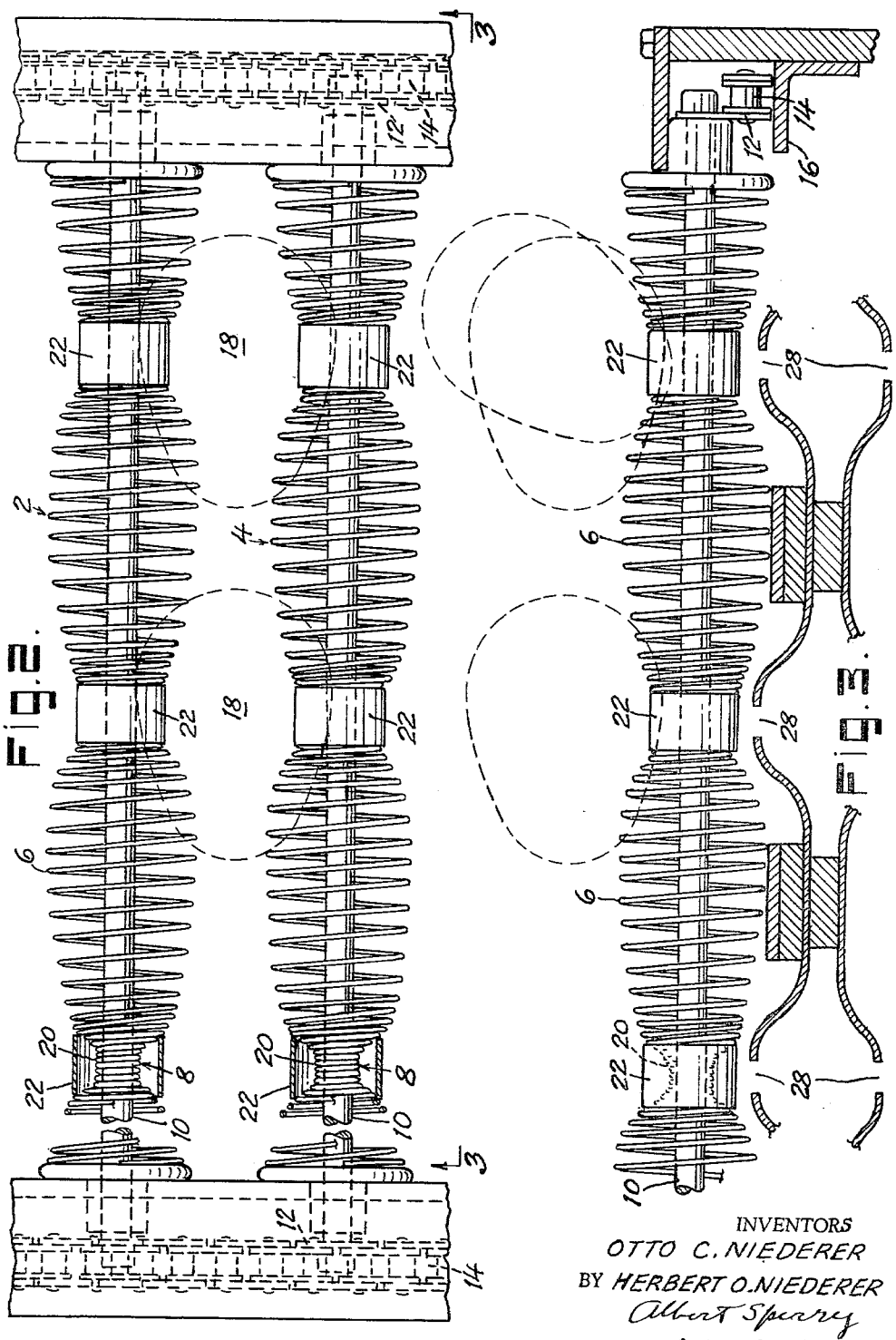
INVENTORS
OTTO C. NIEDERER
BY HERBERT O. NIEDERER
Albert Sperry
ATTORNEY United States Patent Office 3,216,549
Patented Nov. 9, 1965

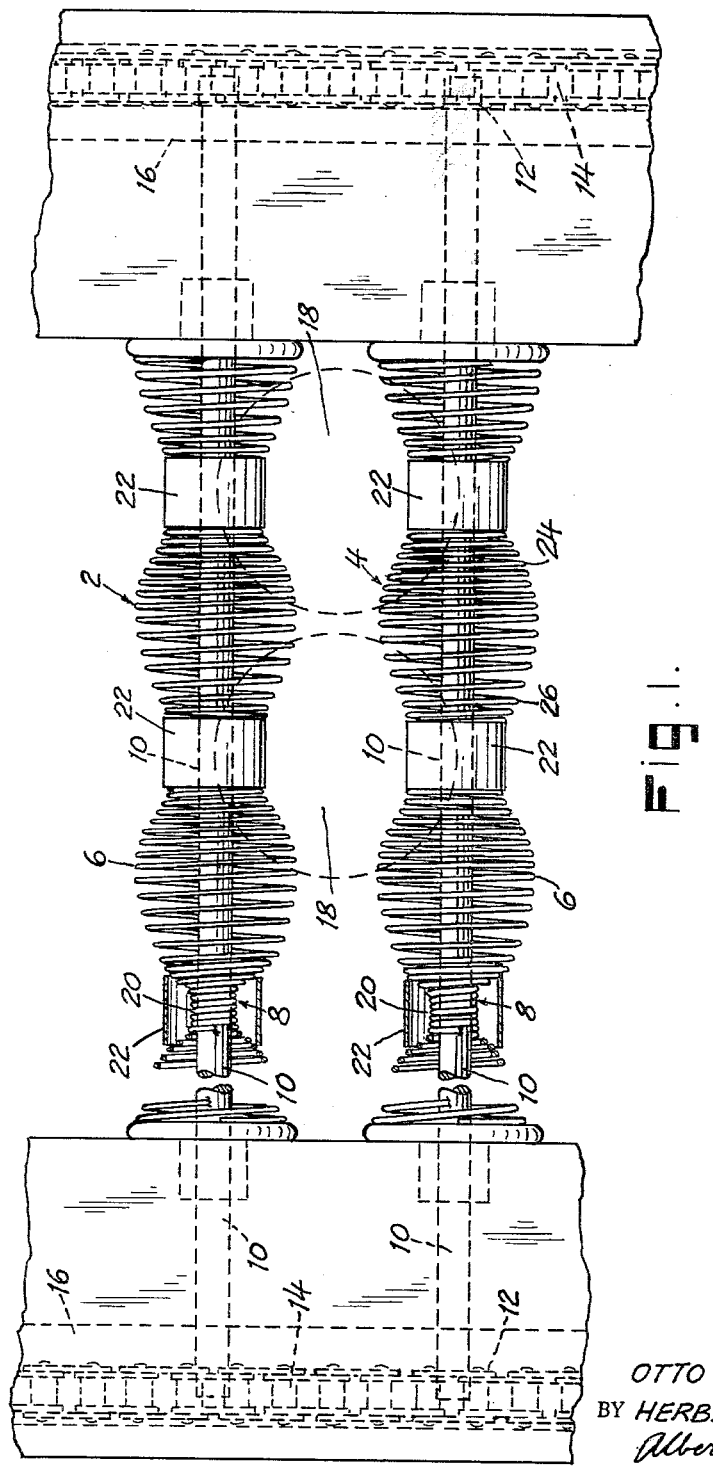

3,216,549
EGG SUPPORTING MEANS
Otto C. Niederer, Bear Tavern Road, and Herbert O.
Niederer, Church Road, both of Titusville, N.J.
Filed June 28, 1963, Ser. No. 291,507
5 Claims. (Cl. 198—30)

This invention relates to egg-handling equipment and is directed particularly to constructions for use in the candling of eggs.

In Patent No. 3,128,761 and copending application Ser. No. 179,050, now Patent No. 3,155,102, and Ser. No. 201,890, constructions are shown wherein eggs being fed to or through egg-grading, egg-candling, and egg-washing equipment are moved by a conveyor having egg-supporting surfaces in the form of coiled spring members. Such members generally surround rods which extend transversely of the conveyor and are variable in length to vary the position and relative spacing of the eggs. The coiled spring members generally are formed and arranged to present alternate portions of relatively large and relatively small diameter which cooperate to provide egg-receiving and positioning recesses between the springs.

Such equipment has been widely used, but it is sometimes found that relatively small eggs move downward within the recesses formed by the portions of adjacent springs of smaller diameter so as to assume and remain in a vertical position instead of lying down horizontally in a position to permit them to be readily candled, washed, or otherwise handled. Furthermore, it has been found, in some instances, that the larger portions of the coiled spring members tend to tilt or to project upward or sideways when compressed instead of remaining accurately centered about the rod by which they are positioned. The eggs then may be displaced so that, when candled, some light may pass between or about the eggs to the closed chamber surrounding the illuminated eggs.

While the tilting or displacement of coiled spring members is sometimes troublesome when eggs are being graded or washed, the problem is of particular importance in modern egg-candling operations wherein the light employed in candling the eggs is very powerful, and any small or stray beam of light escaping between or around the eggs or reflected brightly from adjacent eggs will tend to blind the operator and seriously interfere with the candling operation.

These problems are overcome in accordance with the present invention by forming the coiled spring members with relatively extended portions of reduced diameter affording a longer bearing surface for engagement with a transverse rod and reducing the tendency for the enlarged portions of the coiled springs to tilt with reference to the rod. It is further preferred to provide the spring member with a collar or sleeve which surrounds the portion of reduced diameter so that it not only aids in holding the enlarged portions of the spring member in alignment, but also prevents small eggs fom moving downward between the spring members so as to assume a vertical position. When such sleeves are formed of smooth opaque material such as metal, they allow the ends of the eggs to slip freely thereover and facilitate the movement of the eggs from vertical to horizontal positions. Moreover, the sleeves aid in blocking off the light in a candling operation whereby all of the eggs carried by the conveyor can be moved readily and accurately into a horizontal or candling position and the escape of light between the eggs is effectively prevented.

It is also desirable in accordance with the present invention to form the enlarged portions of the coiled spring members so that they are not symmetrical but have the portions thereof facing in one direction tapered more gradually than the opposite ends of the enlarged portions. When so formed, the eggs deposited on the conveyor all tend to tilt in one direction from their initial vertical positions whereby the larger ends of all eggs may be presented to an operator standing on one side of the conveyor and candling of the eggs is simplified.

Accordingly, the principal objects of the present invention are to provide improved conveyors for egg-handling equipment, to reduce the tendency for coiled spring elements of conveyors to tilt or cock with respect to a rod passing therethrough, to facilitate the movement of eggs from vertical to horizontal positions on a conveyor, to prevent small eggs from moving downward to undesired positions between adjacent coiled spring members on a conveyor, and to decrease the passage of light through a conveyor and about or between eggs supported on a conveyor during a candling operation.

These and other objects and features of the present invention will appear from the following description thereof wherein reference is made to the figures of the accompanying drawing.

In the drawings:

FIG. 1 is a plan view of a portion of a typical conveyor embodying the present invention with the coiled spring members thereof compressed to receive eggs;

FIG. 2 is a view similar to FIG. 1 showing the coiled spring members expanded; and FIG. 3 is a sectional view through the conveyor taken on the line 3—3 of FIG. 2.

In that form of the invention chosen for purposes of illustration in the drawings, the coiled spring members are indicated at 2 and 4 and are formed with portions 6 of relatively large diameter with intermediate portions 8 of smaller diameter. The spring members are supported by rods 10 which pass axially therethrough and are secured at their opposite ends to brackets 12 carried by chains 14 supported on frame members 16.

The portions 8 of adjacent spring members which are of smaller diameter cooperate to define egg-receiving recesses 18. Further, as shown at 20 in each figure, a plurality of the turns of wire at the center of the reduced portions 8 are substantially equal in diameter and have an internal diameter or opening therethrough which is only slightly larger than the rod 10 which they surround. The turns 20 of the coiled spring thus present a somewhat elongated and cylindrical inner bearing surface which loosely engages the rod 10. The bearing surface thereby provided serves to oppose any tendency for the enlarged portions 6 of the coiled springs to tilt or cock transversely with respect to the rod 10. As a result, the coiled spring members remain substantially concentric with the rods 10 at all times and even when they are compressed lengthwise as shown in FIG. 1.

The coiled spring members also are preferably provided with a sleeve or collar 22 which may consist of a split metal band which can be readily placed about the turns 20 of the reduced portions of the coiled spring members. The ends of the collar 22 engage the somewhat enlarged turns of the coiled spring member at opposite sides of the reduced portion 8 thereof and further aid in preventing tilting or cocking of the larger portions 6 of the spring members. Moreover, the collars 22 are of such diameter that they prevent small eggs from slipping downward into a vertical position wherein they might otherwise be held between the coiled spring members and in the egg-receiving recesses 18. As a result, all of the eggs supported by the coiled spring members are held in position to move readily from vertical or inclined positions in which they are deposited on the conveyor when the spring members are compressed to the positions shown in FIG. 1, to horizontal positions as shown in FIG. 2 when the spring members expand lengthwise of the rods 10.

The sleeves or collars 22 are preferably formed of smooth material such as polished metal upon which the lower ends of the eggs can slip or move readily from one position to another as the spring members are elongated or compressed. Further, as shown most clearly in FIG. 1, the enlarged turns of the coiled spring members which form the portions 6 thereof are not completely symmetrical between the reduced portions 8. The turns 24 adjacent one end of the enlarged portion 6 are preferably somewhat larger in diameter than those turns 26 adjacent the other end thereof. Accordingly, the egg-engaging surfaces of the coiled spring members present a combined surface which is inclined more gradually at one side of the egg-receiving cavity 18 than the other. The cavity, therefore, actually conforms more nearly to the shape of the eggs whereby the upper or larger ends of the eggs are supported and automatically tend to move to the right, as seen in the figures, while the smaller lower ends of the eggs slip freely over the metal collars to the left as spring members are elongated. In this way, the larger ends of the eggs tend to move toward one side of the conveyor and into positions which facilitate the candling thereof.

When conveyors of the type shown and described are employed in candling operations, the reduced portions 8 thereof, about which the sleeves or collars 22 are located, are positioned to pass over the light-transmitting slot 28 at the candling station. The sleeves, being opaque and located between the cavities 18 in which the eggs are located, block off or preclude the passage of light from the light slot to the eyes of the operator. Moreover, they prevent undue glare or reflection of light from the sides of adjacent eggs whereby the light observed by the operator is limited to that which passes through the eggs.

The inspection and proper candling of the eggs is thereby improved and the accuracy and speed at which the candling operation is carried out can be increased.

The use of collars or sleeves such as those shown at 22 is desirable in all operations whether the eggs are to be candled, washed, or otherwise handled, since the positioning of small eggs and the movement thereof on the conveyor is thereby controlled more effectively. Furthermore, the provision of a plurality of wire turns of like diameter in the reduced portions 8 of the spring members to form an extended bearing surface is of advantage whether the enlarged portions 6 are symmetrical in outline or not.

The collars 22 are preferably formed so that when unstressed they are somewhat smaller in diameter than when applied to the spring members. They then can be expanded when applied over the smaller turns 20 and will spring back and grip the larger turns of wire at opposite sides of the reduced portion of the spring members.

The collars can, of course, be formed of any suitable material such as plastic, rubber, or the like, but they are preferably opaque when used on conveyors employed in egg-candling equipment. They also should present a smooth outer surface to permit free sliding movement of eggs thereover when the eggs are to move from vertical to horizontal positions. Therefore, split spring metal collars polished on their outer surfaces are preferred.

The form, construction and composition of the conveyors, spring members, and collars employed in the practice of the present invention can, of course, be varied considerably. It should, therefore, be understood that the particular embodiment thereof shown in the drawings and described above is intended to be illustrative only and is not intended to limit the scope of the invention.

We claim:

1. Egg handling equipment comprising a conveyor embodying a plurality of parallel rods extending transversely of the conveyor, egg supporting members in the form of coiled springs surrounding said rods and having alternately arranged portions of relatively large diameter and of relatively small diameter, the portions of relatively small diameter on adjacent egg supporting members on the conveyor being positioned to cooperate in forming a row of egg receiving recesses extending transversely of the conveyor, and means coextensive with said portions of relatively small diameter and having an opacity continuous throughout the area occuring between corresponding recesses of adjacent egg supporting members, so as to reduce the passage of light between eggs supported in said corresponding recesses.

2. Egg handling equipment comprising a conveyor embodying a plurality of parallel rods extending transversely of the conveyor, egg supporting members in the form of coiled springs surrounding said rods and having alternately arranged portions of relatively large diameter and of relatively small diameter, the portions of relatively small diameter on adjacent egg supporting members on the conveyor being positioned to cooperate in forming a row of egg receiving recesses extending transversely of the conveyor, said portions of relatively small diameter including bearing means closely but loosely embracing said rods and extended a sufficient distance lengthwise of the rods to oppose tilting of the larger portions of said egg supporting members with respect to said rods.

3. Egg handling equipment comprising a conveyor embodying a plurality of parallel rods extending transversely of the conveyor, egg supporting members in the form of coiled springs surrounding said rods and having alternately arranged portions of relatively large diameter and of relatively small diameter centered with respect to said rods, the portions of relatively small diameter on adjacent egg supporting members on the conveyor being positioned to cooperate in forming a row of egg receiving recesses extending transversely of the conveyor, said portions of relatively small diameter including a plurality of turns of wire of substantially the same diameter, and sleeve means loosely receiving said portions of smaller diameter and coextensive with at least said turns of smaller diameter, each sleeve means having its opposite ends abutting adjacent portions of relatively large diameter, to oppose tilting of the larger portions of the egg supporting members with respect to said rods.

4. Egg handling equipment comprising a conveyor embodying a plurality of parallel rods extending transversely of the conveyor, egg supporting members in the form of coiled springs surrounding said rods and having alternately arranged portions of relatively large diameter and of relatively small diameter, the portions of relatively small diameter on adjacent egg supporting members on the conveyor being positioned to cooperate in forming a row of egg receiving recesses extending transversely of the conveyor, and a collar surrounding said portions of relatively small diameter and having the opposite ends thereof in engagement with adjacent portions of said egg supporting members which are of relatively large diameter.

5. Egg handling equipment comprising a conveyor embodying a plurality of parallel rods extending transversely of the conveyor, egg supporting members in the form of coiled springs surrounding said rods and having alternately arranged portions of relatively large diameter and of relatively small diameter, the portions of relatively small diameter on adjacent egg supporting members on the conveyor being positioned to cooperate in forming a row of egg receiving recesses extending transversely of the conveyor, and a split metal collar surrounding said portions of relatively small diameter and having the opposite ends thereof in engagement with adjacent portions of said egg supporting members which are of relatively large diameter.

References Cited by the Examiner
UNITED STATES PATENTS 2,531,292 11/50 Page _____ 198—30
3,148,761 9/64 Niederer.

SAMUEL F. COLEMAN, *Primary Examiner.*

EDWARD A. SROKA, *Examiner.*